(12) United States Patent
Miller et al.

(10) Patent No.: US 10,948,907 B2
(45) Date of Patent: Mar. 16, 2021

(54) SELF-DRIVING MOBILE ROBOTS USING HUMAN-ROBOT INTERACTIONS

(71) Applicant: Ford Global Technologies, LLC, Dearborn, MI (US)

(72) Inventors: Justin Miller, Royal Oak, MI (US); Sanghyun Hong, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/112,185

(22) Filed: Aug. 24, 2018

(65) Prior Publication Data

US 2020/0064827 A1 Feb. 27, 2020

(51) Int. Cl.
*G05D 1/00* (2006.01)
*G06F 3/01* (2006.01)
*G05D 1/02* (2020.01)
*G06K 9/00* (2006.01)

(52) U.S. Cl.
CPC ......... *G05D 1/0016* (2013.01); *G05D 1/0088* (2013.01); *G05D 1/0212* (2013.01); *G06F 3/017* (2013.01); *G06K 9/00389* (2013.01); *G06K 9/00664* (2013.01)

(58) Field of Classification Search
CPC .. G05D 1/0016; G05D 1/0088; G05D 1/0212; G06F 3/017; G06K 9/00389; G06K 9/00664
See application file for complete search history.

(56) References Cited

U.S. PATENT DOCUMENTS

| | | | |
|---|---|---|---|
| 7,539,557 B2 | 5/2009 | Yamauchi | |
| 8,718,837 B2 | 5/2014 | Wang et al. | |
| 10,438,062 B1* | 10/2019 | Beard | H04N 7/181 |
| 2012/0197464 A1* | 8/2012 | Wang | G06T 11/60 |
| | | | 701/2 |
| 2015/0262002 A1* | 9/2015 | Matsunaga | G06K 9/00355 |
| | | | 382/103 |
| 2017/0337506 A1* | 11/2017 | Wise | G06Q 10/087 |
| 2019/0240535 A1* | 8/2019 | Santra | A63B 22/025 |
| 2020/0033479 A1* | 1/2020 | Schultz | G06T 7/73 |

FOREIGN PATENT DOCUMENTS

CN 106881716 A 6/2017

OTHER PUBLICATIONS

Hasanuzzaman, et al., "Gesture Recognition for Human-Robot Interaction Through a Knowledge Based Software Platform," LNCS, 2004, vol. 3211, pp. 530-537.

* cited by examiner

*Primary Examiner* — Zhitong Chen
(74) *Attorney, Agent, or Firm* — Brandon Hicks; Eversheds Sutherland (US) LLP

(57) ABSTRACT

Systems, methods, and computer-readable media are disclosed for enhanced human-robot interactions. A device such as a robot may send one or more pulses. The device may identify one or more reflections associated with the one or more pulses. The device may determine, based at least in part on the one or more reflections, a cluster. The device may associate the cluster with an object identified in an image. The device may determine, based at least in part on an image analysis of the image, a gesture associated with the object. The device may determine, based at least in part on the gesture, a command associated with an action. The device may to perform the action.

20 Claims, 11 Drawing Sheets

SELF-DRIVING MOBILE ROBOTS USING HUMAN-ROBOT INTERACTIONS

TECHNICAL FIELD

The present disclosure generally relates to devices, systems, and methods for mobile robots and, more particularly, to self-driving mobile robots using human-robot interactions.

BACKGROUND

Self-driving robots are used for a variety of functions. As the capabilities of self-driving robots improve, the use applications of self-driving robots may increase.

DETAILED DESCRIPTION

Figure 1:
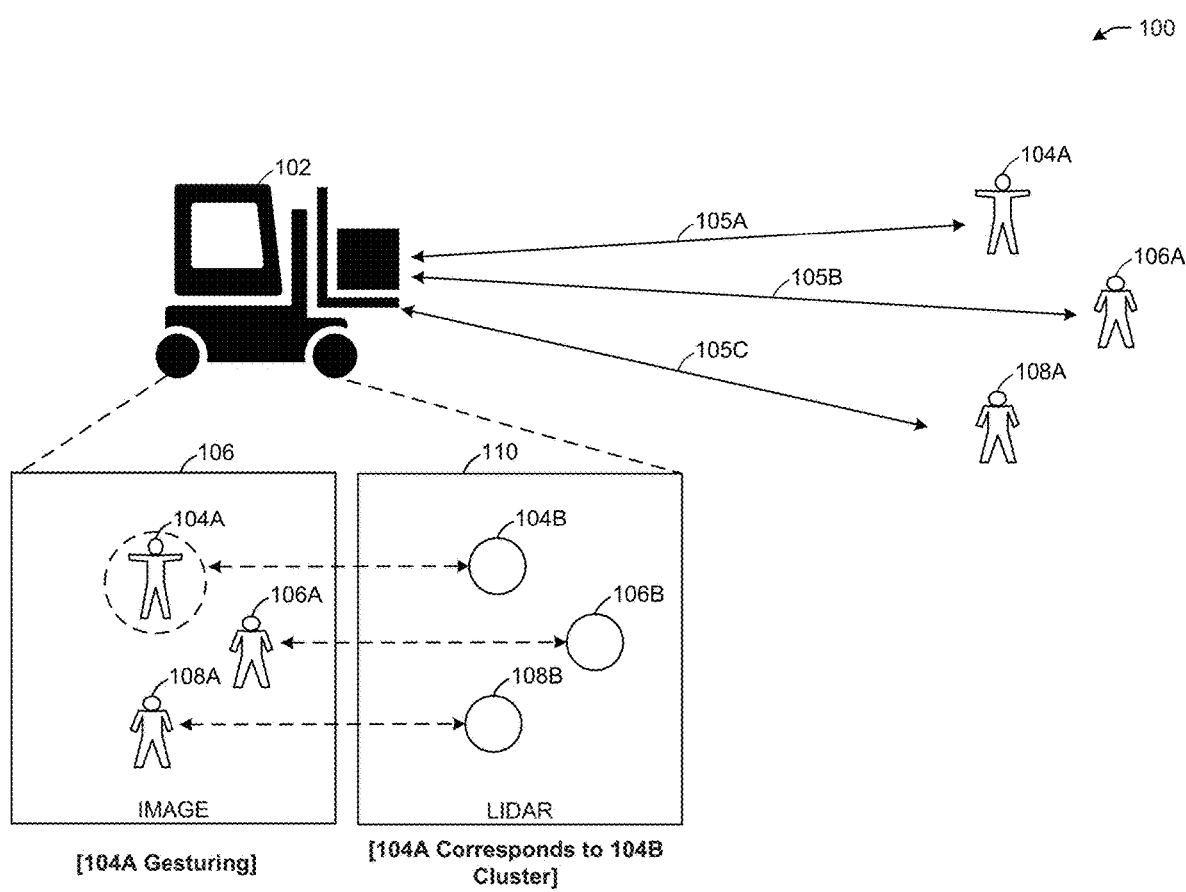
FIG. 1 is an illustration of an example environment with a self-driving mobile robot and a human user, in accordance with one or more embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Successful operation of autonomous systems, such as self-driving cars and self-delivering robotic platforms, may become increasingly dependent on their ability to interact with humans, especially in environments mixed with humans, such as densely populated city centers or manufacturing assembly plants. For example, a robot may include one or more computing devices which may detect people and objects in a nearby area, and may respond to commands provided by nearby users and identified by the robot. However, when the nearby area has multiple people and/or objects, the robot may struggle to differentiate between different people and objects, and to recognize which users may be gesturing to the robot with the intent to cause the robot to execute a command associated with the gesture. Likewise, a noisy environment may result in difficulties for the robot to detect voice gestures.

Some human-robot interactions address humans interacting with autonomous vehicles such as robots and self-driving cars. In some vehicles and computer infrastructures, human-to-human interactions may be used between drivers and road users to accomplish effective driving, which may be useful for the self-driving cars to be effective. In addition to self-driving cars, human-robot interaction (HRI) may be valuable in a variety of autonomous systems, ranging from manufacturing to service robots. Such systems may interact with humans collaboratively, coordinately, and in socially acceptable ways to achieve the desired effectiveness, efficiency, and automation performance.

Example embodiments of the present disclosure relate to ways for a robot to identify nearby objects and people, identify one or more gestures provided by a person, and respond to the person's commands.

Example embodiments of the present disclosure relate to enhanced devices, systems, and methods for self-driving mobile robots using HRI.

In one or more embodiments, one method for enhanced HRI may include implementations in which humans may provide instructions to an autonomous, self-driving robot while in the robot's proximity. A virtual driver system of the robot may be observing humans in the robot's vicinity, identifying the commands to follow from a human operator, and allowing the human operator to share control of the robot with another person, machine, device, or the like.

In one or more embodiments, an autonomous solution for a robot may enable a self-driving operation in socially acceptable and safe ways. A robot platform may leverage vision-based human pose detection to extract one or more gestures corresponding to various commands that the human operator wants the robot to perform. For example, using computer-based image analysis techniques designed for computers to recognize objects and people in digital images, a robot may identify objects and people nearby. By analyzing the body position of an identified person as explained further herein, a robot may detect that a person is gesturing with an intent to command the robot. For example, a right hand up position may correspond to a command, such a follow-me command (e.g., a command for the robot to follow the person identified as providing the command). In the case of a follow-me command, cluster-based Lidar tracking may be used to allow the robot to associate a command with a cluster of similar objects to follow behind the cluster, which may correspond to the person who provided the gesture. In the case of a parking command, automated decision-making may be used to account for potentially occupied parking spots and to navigate around objects in the robot's path.

While computer-based image analysis may be used to identify objects and angles to identified objects, Lidar may be used to measure distances between a robot and an object and to determine object location using clusters of data points having some similarity. Lidar may refer to the directional sending of laser pulses, and the detection of reflections from objects. The reflected signals may be used to measure distances to objects which cause the reflections. Reflected signals may be used to identify object clusters. Clusters may represent a set of data points with some similarity to one another (e.g., clusters of reflected pulses with similar energy or reception timing). The user of Lidar and clustering may allow a robot to identify data points associated with reflections of laser pulses and associate related data points with one another in a cluster which may correspond to an object or person at a given distance from the robot. However, identifying a cluster may not mean detecting what the cluster is or if the cluster represents a person providing a gesture, so the clusters may be compared with objects identified in an image to associate gestures to a cluster (e.g., location).

In one or more embodiments, enhanced HRI may provide the following advancements over other HRI systems and methods. Enhanced HRI may implement a pose-based gesture approach for a human user to issue commands to a robot. Enhanced HRI may implement a follow-me approach for providing path-planning commands to the robot based on Lidar cluster tracking. Enhanced HRI may implement an automated decision making framework for commanding the robot to park.

In one or more embodiments, static human gestures may be determined using a camera-based pose estimation. For example, given an image of human, an open-source library (e.g., OpenPose or another pose estimation algorithm) may be used to estimate the pixel coordinates for joints/body parts of a human body recognized within the image.

In one or more embodiments, gestures may be defined as Boolean values $g_i \in \{0,1\}$ where the i-th gesture takes a value of 1 if the gesture is being performed and 0 otherwise. Arm gestures may be considered as an example of determining gestures from geometry. The following gestures, among other gestures, may be implemented on the robot: "hand up," "arm up," and "arm out," in which each gesture may be evaluated separately for the right or left human body joints. For example, to determine if a hand is up, a robot may determine based on image analysis whether the hand is above the neck. To perform such analysis, the robot may use computer-based image analysis techniques (e.g., analyzing compressed digital data to detect patterns based on pixel data which otherwise may not be detected by human eyes) designed to allow computer processors to identify objects in an image and their locations (e.g., on an X-Y coordinate plane). If the vertical coordinate of the hand is greater than the vertical coordinate of the neck, a robot may determine that the hand is above the neck, and that a hand up gesture is shown in the image. Once a gesture is identified in an image, the robot may associate the gesture with a command. For example, stored commands may be mapped to identified gestures, and the commands may be associated with multiple functions which may cause the robot to perform actions.

In one or more embodiments, once a gesture command is received and identified by the robot, the robot may initiate a variety of tasks/actions. For example, an initial left arm up gesture may command the robot to begin parking while another left arm up gesture may command the robot to abort the parking maneuver and come to a stop. Similarly, a right arm up gesture may command the robot to begin following the person who made the gesture, and repeating the right arm up gesture may command the robot to stop following. Unlike the other commands, a follow-me task may require the context of which person made the command so that the robot knows who to follow. This process is described further below.

In one or more embodiments, the robot may identify the direction of an initial gesture, then may associate that gesture with a tracked object, and may plan paths to follow the object autonomously. For example, the robot may maintain a particular distance to the object when tracking the object. To maintain a distance from the object, the robot may continue to send pulses and receive pulse reflections with a cluster that has been associated with the object that the robot is to follow. The reflected pulses may be used to calculate a distance between the robot and the object. Because other clusters may be identified and associated with other objects, the robot may need to maneuver around the other identified clusters/objects to stay on a path to follow the object. An identified follow-me task may use information regarding the location of a human in an image. The pixel coordinates $(u_{neck}, v_{neck})$ may used to represent the human's location. Through intrinsic and extrinsic calibration of robot cameras, pixel information may be projected into a coordinate frame of the robot. However, a complete transformation from a two-dimensional camera frame to a three-dimensional robot frame is not possible as there is a missing degree of information: depth. Therefore, the 2D point may be transformed into a 2D unit vector in 3D space.

In one or more embodiments, the robot may use dynamic clustering to identify objects and people. Dynamic clustering may be used to track objects around the robot as Lidar clusters. Among the tracked clusters may be any human who initiates a gesture. The gesture direction in the form of a unit vector may be used to identify a human's cluster. Given a set of $N_c$ clusters each with 3D coordinates $(x_c, y_c, z_c)$, the assigned cluster c* is that which best aligns to the gesture in terms of a yaw angle.

In one or more embodiments, the tracked cluster that has been identified as having generated the gesture automatically may be set as the human-following target. To follow the human, the robot regularly may be assigned navigation goals that are a fixed offset behind the human. Given the 2D coordinates of a tracked cluster $(x_c, y_c)$ and the robot's current coordinates $(x_r, y_r)$, the robot's goal coordinates $(x_g, y_g)$ may be set.

In one or more embodiments, after a human provides a command to a robot, the robot may experience external circumstances preventing it from executing that command. For example, if the robot is told to park at a specific location, the robot may not be able to park at the location if the location is already occupied by an object. In such cases, either the robot may query the human for additional input or the robot automatically may determine a contingency plan to accomplish the task.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is an illustration of an example environment 100 with a self-driving mobile robot 102 and a human user 104A, in accordance with one or more embodiments of the disclosure.

Referring to FIG. 1, the self-driving mobile robot 102 may send and receive one or more Lidar laser pulses (e.g., pulse 105A, pulse 105B, pulse 105C) in different directions. The Lidar pulses may be reflected back to the self-driving mobile robot 102 from one or more humans. For example, pulse 105A may reflect back to the self-driving mobile robot 102 from the human 104A, pulse 105B may reflect back to the self-driving mobile robot 102 from human 106A, and pulse 105C may reflect back to the self-driving mobile robot 102 from human 108A. Based on the reflections, the self-driving mobile robot 102 may identify clusters 110 of data points associated with the reflections. For example, clusters 110 may include cluster 104B, cluster 106B, and cluster 108B. The self-driving mobile robot 102 may capture one or more images of nearby surroundings. For example, the self-driving mobile robot 102 may capture image 106, which may show human 104A, human 106A, and human 108A. Using image analysis techniques, the self-driving mobile robot 102 may identify the humans in the image 106. Based on the identified humans in the image 106 and on the Lidar clusters 110, the self-driving mobile robot 102 may associate the humans in the image 106 to the clusters 110. This way, the self-driving mobile robot 102 may identify the locations of the humans in the image 106.

Still referring to FIG. 1, the human 104A may be gesturing to the self-driving mobile robot 102. For example, the human 104A may be using a gesture to communicate a command to the self-driving mobile robot 102. Using image analysis techniques, the self-driving mobile robot 102 may analyze the image 106 to determine that the human 104A is in a pose (e.g., arms out) in the image 106, and that the pose represents one or more commands which the self-driving mobile robot 102 may execute. Based on the association with the image 106 to the clusters 110, the self-driving mobile robot 102 may determine that the gesture command is associated with cluster 104B. This way, for example, if the gesture represents a command to follow the human 104A, the self-driving mobile robot 102 may focus on the cluster 104B for further commands and for determining how to follow the human 104A. For example, the self-driving mobile robot 104 may limit responses to identified gestures to those which are associated with cluster 104B until otherwise instructed.

Figure 2A:
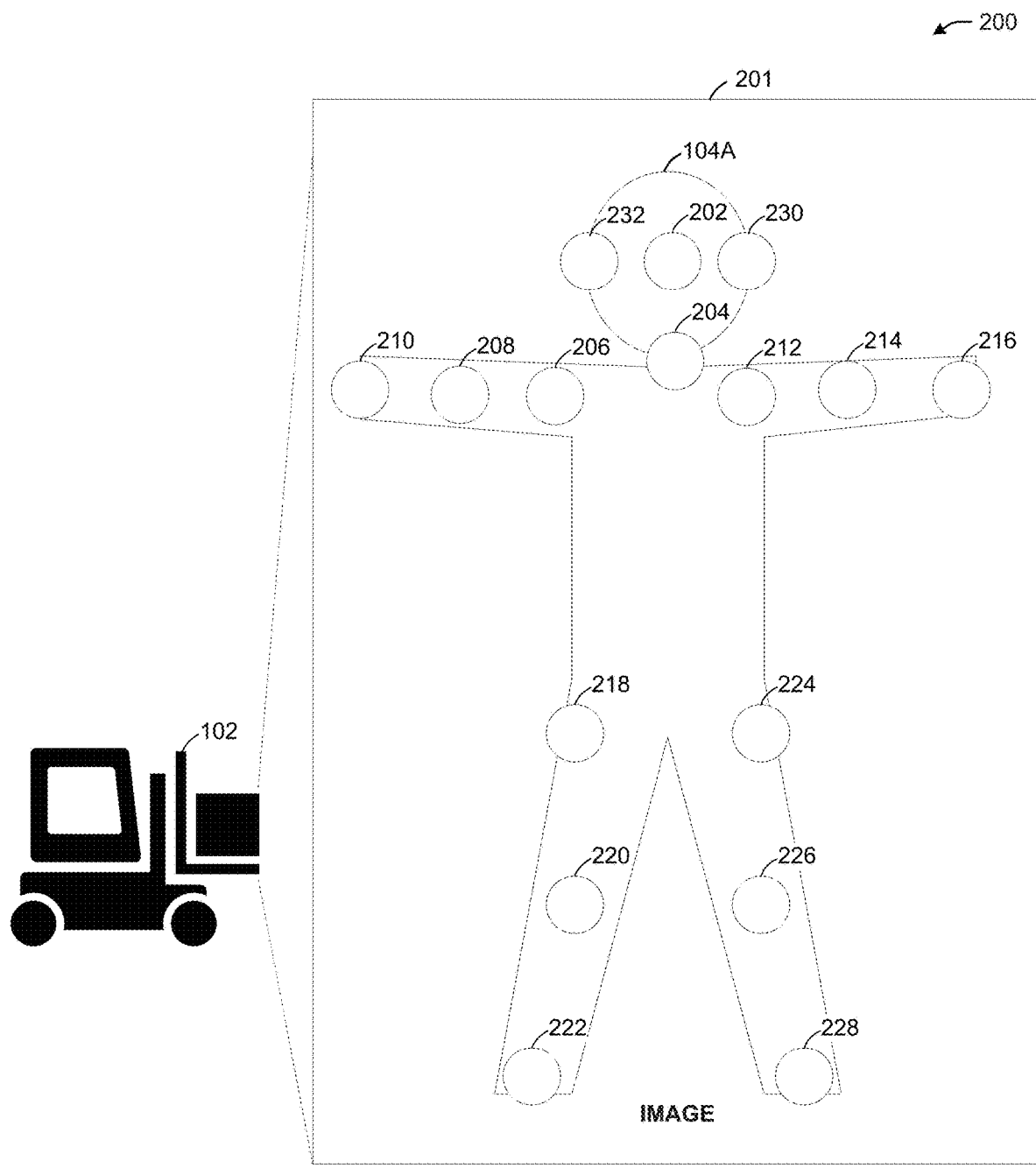
FIG. 2A depicts an illustrative gesture detection system for a self-driving mobile robot, in accordance with one or more embodiments of the disclosure.

FIG. 2A depicts an illustrative gesture detection system 200 for a self-driving mobile robot, in accordance with one or more embodiments of the disclosure.

Referring to FIG. 2A, the self-driving mobile robot 102 of FIG. 1 may perform an image analysis using the gesture detection system 200 to identify gestures which may correspond to commands. For example, an image 201 may shows the human 104A of FIG. 1. Parts of the human 104A may be represented by a coordinates (e.g., X-Y plane coordinates). The following parts may be represented by different coordinates: nose 202, neck 204, right shoulder 206, right elbow 208, right hand/wrist 210, left shoulder 212, left elbow 214, left hand/wrist 216, right hip 218, right knee 220, right ankle/foot 222, left hip 224, left knee 226, left ankle/foot 228, left ear 230, and right ear 232.

In one or more embodiments, using facial recognition and other object detection, the self-driving mobile robot 102 may identify the body parts of the human 104A in the image 201. Knowing the body parts, the self-driving mobile robot 102 may identify the locations of the body parts in the image based on their respective coordinates.

Static gestures may be determined using camera-based pose estimation of the image 201. Each joint label may have estimated pixel coordinates u and v, where the origin of the coordinates (e.g., 0,0) may be chosen to be the lower left pixel of the image 201. Gestures may be estimated from the geometric relations between specific body joints.

Gestures may be defined as Boolean values $g_i \in \{0,1\}$ where the i-th gesture takes value 1 if the gesture is being performed and 0 otherwise. Arm gestures may be considered as an example of determining gestures from geometry. The following gestures may be implemented on the self-driving mobile robot 102: "hand up" $g_{hu}$, "arm up" $g_{au}$, and "arm out" $g_{ao}$, where each gesture may be evaluated separately for the right or left joints.

An "arm out" gesture may be determined if the wrist/hand (e.g., wrist/hand 210) is a sufficient distance away from the shoulder (e.g., shoulder 206). To account for scaling, the distance may be specified in terms of shoulder width. The arm out gesture may be determined by $g_{ao} = (|u_{wrist} - u_{shoulder}| > \alpha w)$, where $w = |u_{leftShoulder} - u_{rightShoulder}|$ and $\alpha$ is a scaling factor chosen empirically to be 1.25 or some other value. If the length between wrist/hand and shoulder is greater than a shoulder width adjusted by the scaling factor, then an arm out gesture may be identified.

Once a gesture command is received by the self-driving mobile robot 102, the self-driving mobile robot 102 may initiate a variety of tasks. For example, an initial left arm up gesture may command the self-driving mobile robot 102 to begin parking while another left arm up gesture may command to abort the parking maneuver and come to a stop. Similarly, a right arm up gesture may commands the self-driving mobile robot 102 to begin following the person who made the gesture (e.g., the human 104A, who may be associated with cluster 104B of FIG. 1), and repeating the gesture may command the self-driving mobile robot 102 to stop following. Unlike some other commands, the follow-me task may require the context of which person made the command so that the robot knows who to follow.

For the follow-me task, the self-driving mobile robot 102 may identify the direction of the initial gesture, then correlate that gesture with a tracked object (e.g., cluster 104B of FIG. 1), and may determine paths to follow the object autonomously.

One step is to determine the direction in which a gesture was made with respect to a base frame of the self-driving mobile robot 102. In addition to a binary measure of a gesture, the follow-me task may use information regarding the location of the human 104A in the image 201. For example, the U-V pixel coordinates ($u_{neck}$, $v_{neck}$) may be used to represent the human's location (e.g., the horizontal and vertical pixel coordinates of neck 204 in the image 201). Through intrinsic and extrinsic calibration of cameras (e.g., as referred to in FIG. 3), the pixel information may be projected into the coordinate frame of the self-driving mobile robot 102. However, a complete transformation from a 2D camera frame to a 3D robot frame may not possible due to depth being unknown. Therefore, a 2D point may be transformed into a 2D unit vector in 3D space using the following equation:

$$(u_{neck}, v_{neck}) \xrightarrow{projection} (x_{gesture}, y_{gesture}, z_{gesture}),$$

where $x_{gesture}^2 + y_{gesture}^2 + z_{gesture}^2 = 1$ with the 3D coordinates being in the direction of the robot base such that x is forward, y is left, and z is up.

Dynamic clustering may be used by the self-driving mobile robot 102 to track objects around the self-driving mobile robot 102 as Lidar clusters (e.g., cluster 104B, 106B, 108B of FIG. 1). Among the tracked clusters will be any human (e.g., human 104A) who initiates a gesture. The gesture direction in the form of a unit vector may be used to identify that human's cluster (e.g., human 104A may correspond to cluster 104B). Given a set of $N_c$ clusters each with 3D coordinates ($x_c, y_c, z_c$), the assigned cluster c* may be that which best aligns to the gesture in terms of the yaw angle as computed by $\tan^{-1}$ where $$c^* = \underset{c}{\operatorname{argmin}} \sum_{c=1}^{N_c} \left| \tan^{-1}\left(\frac{y_c}{x_c}\right) - \tan^{-1}\left(\frac{y_{gesture}}{x_{gesture}}\right) \right|.$$

A tracked cluster (e.g., cluster 104B of FIG. 1) which has been identified as having generated a gesture automatically may be set as the human-following target. To follow the human 104A which corresponds to cluster 104B, the self-driving mobile robot 102 may be assigned navigation goals such as a fixed offset distance behind the human 104A. Given the 2D coordinates of the tracked cluster $(x_c, y_c)$ of cluster 104B and the current coordinates $(x_r, y_r)$ of the self-driving mobile robot 102, goal coordinates $(x_g, y_g)$ for the self-driving mobile robot 102 may be set as $x_g = x_r + (d-o)\cos\theta$, $y_g = y_r + (d-o)\sin\theta$, where o may be a following distance offset, and d and θ may be a distance and angle between the cluster 104B and the self-driving mobile robot 102 given by $d = \sqrt{(x_c - x_r)^2 + (y_c - y_r)^2}$ and $\theta = \tan^{-1}$ $$\left(\frac{y_c - y_r}{x_c - x_r}\right).$$

After the human 104A provides a command to the self-driving mobile robot 102, the self-driving mobile robot 102 may experience external circumstances preventing the self-driving mobile robot 102 from executing that command. For example, if the self-driving mobile robot 102 is instructed to park at a specific location, the self-driving mobile robot 102 may not be able to if that location is already occupied by an obstacle. In such cases, either the self-driving mobile robot 102 may query the human 104A for additional input (e.g., present one or more indications prompting the human 104A for additional user input) or the self-driving mobile robot 102 automatically may determine a contingency plan to accomplish the task.

In one or more embodiments, the self-driving mobile robot 102 may perform automated decision-making in response to a command for the self-driving mobile robot 102 may to park in the presence of occupied parking locations. The self-driving mobile robot 102 may identify a command received from the human 104A based on a predefined gesture (e.g. left hand up) indicating a command for the self-driving mobile robot 102 to park in a parking spot. After the self-driving mobile robot 102 receives the command, the human 104A may stop interacting with the robot for a time. For example, the human 104 may be riding and may exit the self-driving mobile robot 102 (e.g., the self-driving mobile robot 102 may function as an autonomous vehicle), and the human 104A may command via gesture for the self-driving mobile robot 102 to park, and the human 104A may walk away expecting the self-driving mobile robot 102 to achieve the task without further interaction.

Having received a command to park, the self-driving mobile robot 102 may determine an eligible set of available parking spaces. The set of available parking spaces may be determined by searching a set of predefined parking spaces and then determining if they are accessible. Parking space accessibility may be determined by checking an occupancy grid cost map for obstacles. If any grid cells of the cost map corresponding to the coordinates of a parking space are shown as occupied, the space may removed from the eligible set at least for a period of time.

The self-driving mobile robot 102 may determine/be assigned a navigation goal corresponding to the closest unoccupied parking spot. Given an eligible set of $N_p$ parking spots, each with coordinates $(x_p, y_p)$, the self-driving mobile robot 102 may be assigned parking place p*, given by $$p^* = \underset{p}{\operatorname{argmin}} \sum_{p=1}^{N_p} \sqrt{(x_p - x_r)^2 + (y_p - y_r)^2}$$

where $(x_r, y_r)$ are the robot's current coordinates. The self-driving mobile robot 102 may navigate to the assigned parking spot.

If the self-driving mobile robot 102 reaches the goal position and orientation (e.g., within a distance threshold), the parking maneuver may be completed, and the self-driving mobile robot 102 may wait for new commands from another gesture. However, if the assigned parking spot becomes occupied, the spot may be removed from the eligible set, at least temporarily, and parking assignment analysis again may be performed. If no spots are available, the self-driving mobile robot 102 may patrol and check each possible spot until one becomes available and the self-driving mobile robot 102 successfully parks.

If a previously occupied space becomes unoccupied, that space can immediately be re-added to the eligible set. Doing so may lead to oscillatory behaviors if, for example, sensor noise detected by the self-driving mobile robot 102 causes occupied spaces to appear to be unoccupied as the self-driving mobile robot 102 drives away from a space. Therefore, the self-driving mobile robot 102 may avoids checking all previously occupied spaces until the eligible set becomes empty. The result may be that the self-driving mobile robot 102 will move on to the next spot until the self-driving mobile robot 102 begins patrolling.

Figure 2B:
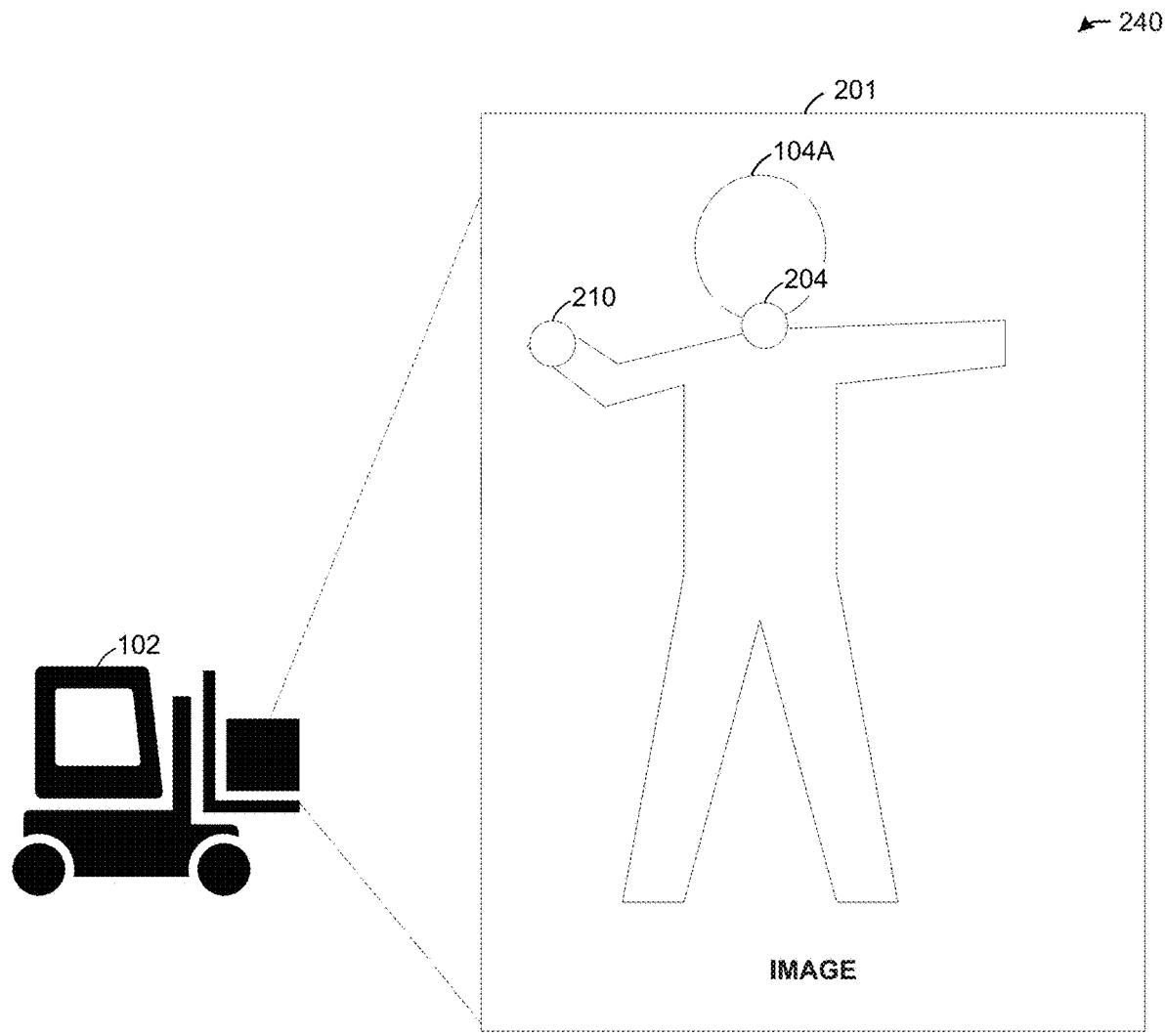
FIG. 2B depicts an illustrative gesture detection system for a self-driving mobile robot, in accordance with one or more embodiments of the disclosure.

FIG. 2B depicts an illustrative gesture detection system 230 for a self-driving mobile robot, in accordance with one or more embodiments of the disclosure.

Referring to FIG. 2B, the gesture detection system 230 associated with the self-driving mobile robot 102 may analyze image 201 to determine whether the human 104A of FIG. 1 is gesturing a command to the self-driving mobile robot 102. For example, the self-driving mobile robot 102 may determine whether the human 104A is providing a hand up gesture.

The "hand up" gesture may be determined if the hand (e.g., hand/wrist 210) is above the neck (e.g., neck 204), given by: $g_{hu} = (v_{wrist} > v_{neck}) \wedge (v_{elbow} < v_{neck})$. The hand up gesture may correspond to any command. For example, the self-driving mobile robot 102 may identify the hand up gesture and determine whether the hand up gesture corresponds to a given command. The command may indicate one or more actions for the self-driving mobile robot 102 to execute, such as moving in a particular direction, moving at a particular speed, lifting up or bringing down an object, retrieving an object, parking, following the human 104A, following another human (e.g., human 106A of FIG. 1), providing indications to the human 104A (e.g., warnings, possible tasks, possible safety concerns, nearby object or people, and the like). The hand up gesture may indicate that the self-driving mobile robot 102 should stop performing an action.

Figure 2C:
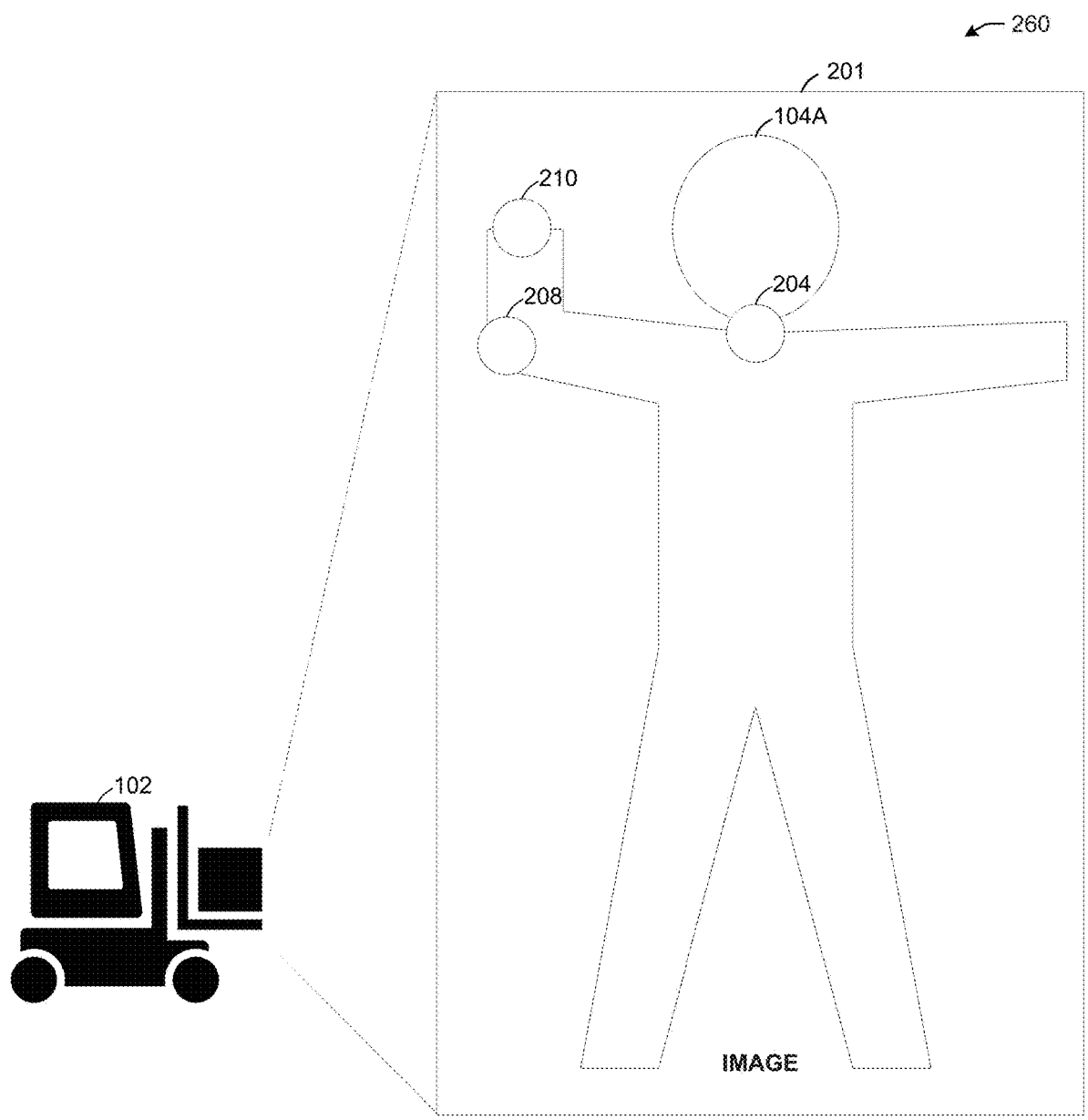
FIG. 2C depicts an illustrative gesture detection system for a self-driving mobile robot, in accordance with one or more embodiments of the disclosure.

Referring to FIG. 2C, the gesture detection system 260 associated with the self-driving mobile robot 102 may analyze image 201 to determine whether the human 104A of FIG. 1 is gesturing a command to the self-driving mobile robot 102. For example, the self-driving mobile robot 102 may determine whether the human 104A is providing an arm up gesture.

The "arm up" gesture may be determined if both the hand (e.g., hand/wrist 210) and elbow (e.g., elbow 208) are above the neck (e.g., neck 204), given by: $g_{au} = (v_{wrist} > v_{neck})^\wedge (v_{elbow} > v_{neck})$. The arm up gesture may correspond to any command. For example, the self-driving mobile robot 102 may identify the arm up gesture and determine whether the arm up gesture corresponds to a given command. The command may indicate one or more actions for the self-driving mobile robot 102 to execute, such as moving in a particular direction, moving at a particular speed, lifting up or bringing down an object, retrieving an object, parking, following the human 104A, following another human (e.g., human 106A of FIG. 1), providing indications to the human 104A (e.g., warnings, possible tasks, possible safety concerns, nearby object or people, and the like). The arm up gesture may indicate that the self-driving mobile robot 102 should stop performing an action.

Figure 3:
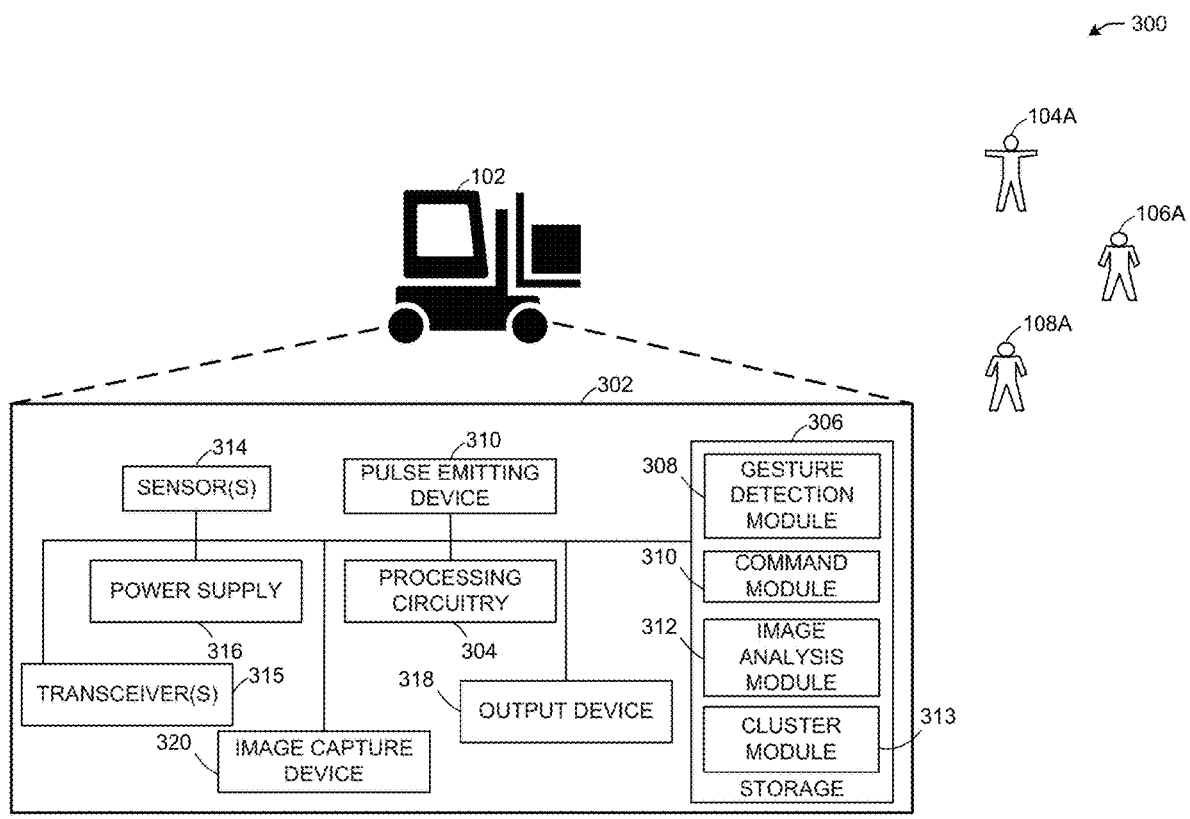
FIG. 3 depicts an illustrative self-driving mobile robot system, in accordance with one or more embodiments of the disclosure.

FIG. 3 depicts an illustrative self-driving mobile robot system 30, in accordance with one or more embodiments of the disclosure.

Referring to FIG. 3, the self-driving mobile robot 102 of FIG. 1 may be nearby human 104A, human 106A, and human 108A of FIG. 1 and may be able to identify the humans and their locations, along with determining whether any of the humans are gesturing a command to the self-driving mobile robot 102.

Still referring to FIG. 1, the self-driving mobile robot 102 may include one or more components which may allow the self-driving mobile robot 102 to perform object/human detection, gesture recognition, and perform actions associated with gestures. The self-driving mobile robot 102 may include a computer device 302, which may include processing circuitry 304, storage 306 (e.g., which may include a gesture detection module 308, a command module 310, an image analysis module 312, and a cluster module 313), one or more sensors 314, one or more transceiver 315, a power supply 316, an output device 318, and an image capture device 320.

The processing circuitry 304 may be configured to execute computer-executable instructions. For example, the processing circuitry 304 may be configured to execute computer-executable instructions of various program module(s), applications, engines, or the like to cause or facilitate various operations to be performed in accordance with one or more embodiments of the disclosure. The processing circuitry 304 may include any suitable processing unit capable of accepting data as input, processing the input data in accordance with stored computer-executable instructions, and generating output data. The processing circuitry 304 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 304 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 304 may be capable of supporting any of a variety of instruction sets.

The storage 306 may include removable storage and/or non-removable storage including, but not limited to, magnetic storage, optical disk storage, and/or tape storage. The storage 306 may provide non-volatile storage of computer-executable instructions and other data. The storage 306, removable and/or non-removable, is an example of computer-readable storage media (CRSM) as that term is used herein.

The storage 306 may store computer-executable code, instructions, or the like that may be executable by the processing circuitry 304 to cause the processing circuitry 304 to perform or initiate various operations. The storage 306 may additionally store data that may be copied for use by the processing circuitry 304 during the execution of the computer-executable instructions. Moreover, output data generated as a result of execution of the computer-executable instructions by the processing circuitry 304 may be copied to the storage 306 for non-volatile storage.

More specifically, the storage 306 may store one or more program module(s), applications, engines, computer-executable code, scripts, or the like. Some or all of these module(s) may be or include sub-module(s). Any of the components depicted as being stored in the storage 306 may include any combination of software, firmware, and/or hardware. The software and/or firmware may include computer-executable code, instructions, or the like that may executed by one or more of the processing circuitry 304. Any of the components depicted as being stored in the storage 306 may support the functionality described in reference to the corresponding components named earlier in this disclosure.

For example, the gesture detection module 308 may include executable instructions which allow the computer device 302 to detect gestures from images (e.g., image 201 of FIG. 2A) by determining that human body poses correspond to gestures. The command module 310 may include executable instructions which allow the computer device 302 to translate gestures into commands which may include actions for the self-driving mobile robot 102 to perform. The image analysis module 312 may include executable instructions which allow the computer device 302 to determine, from an image, whether a person (e.g., human 104A of FIG. 2A) is in the image, and where the body parts of the person may be in the image. The cluster module 313 may include executable instructions which allow the computer device 302 to identify Lidar clusters by causing the sending of laser pulses, detecting reflections of the pulses, identifying locations from where the pulses were reflected, and associating clusters to objects/humans detected in an image.

The pulse emitting device 310 may send one or more laser pulses used for Lidar detection and clustering. The pulse emitting device 310 may send pulses of light and wait for the return of the pulses. The pulse emitting device 310 may include solid state lasers, flash Lidar, phased arrays, and the like.

The transceiver(s) 315 may include any suitable radio component(s) for transmitting or receiving signals in the bandwidth and/or channels corresponding to the communications protocols utilized by the computer device 302 to communicate with other devices. The transceiver(s) 315 may include hardware, software, and/or firmware for modulating, transmitting, or receiving communications signals according to any communication protocols. The transceiver(s) 315 may include any known receiver and baseband suitable for communicating via the communications protocols utilized by the computer device 302. The transceiver(s) 315 may further include a low noise amplifier (LNA), additional power signal amplifiers (PA), an analog-to-digital (A/D) converter, one or more buffers, a digital baseband, or the like. The transceiver(s) 315 may allow the computer device 302 to receive and identify wireless transmissions such as commands and information associated with controlling the self-driving mobile robot 102.

The power supply 316 may be a battery, such as a lithium-ion battery. The power supply 316 may be provided power received from a power charging device such as a battery. The power supply 316 may provide power to the computer device 302.

The sensor(s) 314 may include sensors inside of or external to the self-driving mobile robot 102. For example, the sensor(s) 314 may detect the reflection of Lidar pulses. The sensor(s) 314 may detect and measure reflected energy from pulse reflections, allowing the processing circuitry 304 to determine the distance from an object causing the reflection (e.g., using the speed of light and the time between the sending of a pulse and the reflection of the pulse).

The image capturing device 320 may include a camera for capturing images (e.g., image 201 of FIG. 2A). The image capturing device 320 may respond to inputs received by the computer device 302 indicating requests to take pictures or video. The data captured by the image capturing device 320 may be stored in the storage 306 and used by the image analysis module 312 to identify objects and people (e.g., human 104A, human 106A, human 18A) in images.

The output device 318 may be a display, microphone, or the like, capable of providing video, audio, vibration, or any other type of indication. For example, the output device 318 may allow for display of information, audible warnings regarding nearby objects, reminders, or the like.

Figure 4:
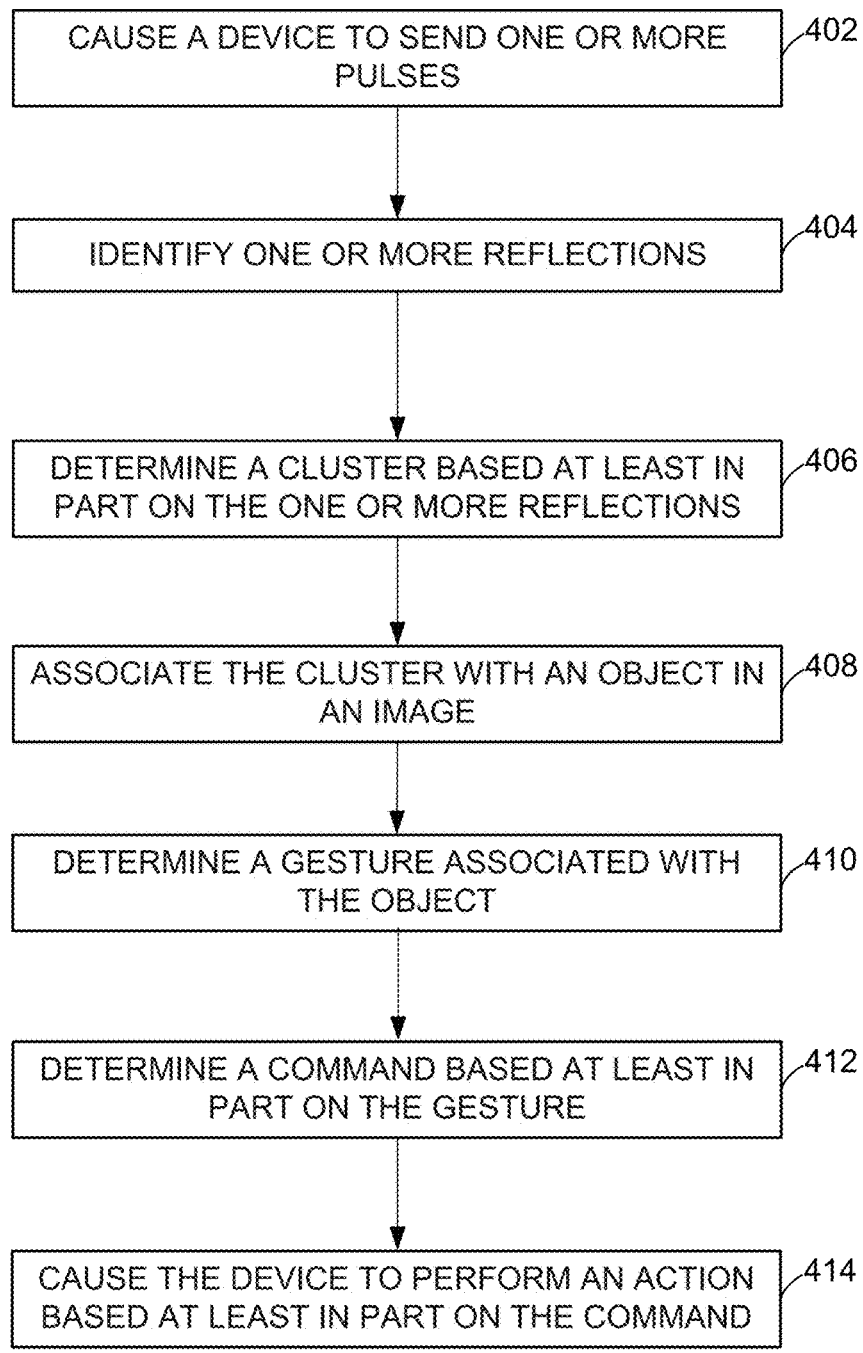
FIG. 4 illustrates a flow diagram for a process of operating a self-driving mobile robot, in accordance with one or more example embodiments of the present disclosure.

FIG. 4 illustrates a flow diagram for a process 400 of operating a self-driving mobile robot, in accordance with one or more example embodiments of the present disclosure.

At block 402, processing circuitry (e.g., processing circuitry 304) of a device (e.g., self-driving mobile robot 102 of FIG. 1) may cause the self-driving mobile robot 102 to send one or more pulses. The one or more pulses may be Lidar laser pulses sent in different directions.

At block 404, the processing circuitry of the device may identify one or more received reflections corresponding to the transmitted pulses in block 402. Sensors may detect energy from laser reflections associated with the transmitted pulses, and given the time when the pulses were transmitted, the time when the reflections were identified, and the speed of light, the distance of objects associated with the reflections may be identified. The reflections may be caused by objects or people.

At block 406, the processing circuitry of the device may determine one or more clusters (e.g., cluster 104B, cluster 106B, cluster 108B of FIG. 1) based on the reflections. Reflections associated with similar data points in a coordinate system may be clustered together to represent an object or person.

At block 408, the processing circuitry of the device may associated a cluster with an object in an image. For example, given image data from a captured image (e.g., image 106 of FIG. 1), the device may identify objects or people (e.g., human 104A, human 106A, human 108A) in the image. The device may transform a two-dimensional point of an image (e.g., a point associated with human 104A) and may transform the into a vector in three-dimensional space. Given a set of clusters, the device may determine which cluster best aligns with the location of an object or user in an image. For example, given a set of $N_c$ clusters each with 3D coordinates $(x_c, y_c, z_c)$, the assigned cluster $c^*$ is that which best aligns to the gesture in terms of the yaw angle as computed by $\tan^{-1}$ $$\left(\frac{y}{x}\right),$$

that is:

$$c^* = \underset{c}{\operatorname{argmin}} \sum_{c=1}^{N_c} \left| \tan^{-1}\left(\frac{y_c}{x_c}\right) - \tan^{-1}\left(\frac{y_{gesture}}{x_{gesture}}\right) \right|.$$

At block 410, the processing circuitry of the device may determine a gesture associated with an object. For example, using image analysis techniques, the device may determine that an identified person in the image is in a pose. To detect a pose, the device may identify the locations of body parts in the image relative to one another and identify whether the poses correspond to any gestures (e.g., hand up, arm out, etc.).

At block 412, the processing circuitry of the device may determine a command based at least in part on the gesture. For example, if a gesture such as arm up or arm out is detected, the device may determine a command assigned to the gesture. The command may be to perform an action or movement.

At block 414, the processing circuitry of the device may cause the device to perform actions associated with the command. For example, if the command is to approach a person, the processing circuitry may cause the device to move toward the person. If the command is to move at a particular speed and/or maintain a specific distance between the device and the person, the processing circuitry may cause the device to move accordingly. If the command is to park the device, the device may search for available parking spaces and navigate to an open parking space. If the command is for the device to provide information or input to the person, the device may respond with outputs accordingly.

Figure 5:
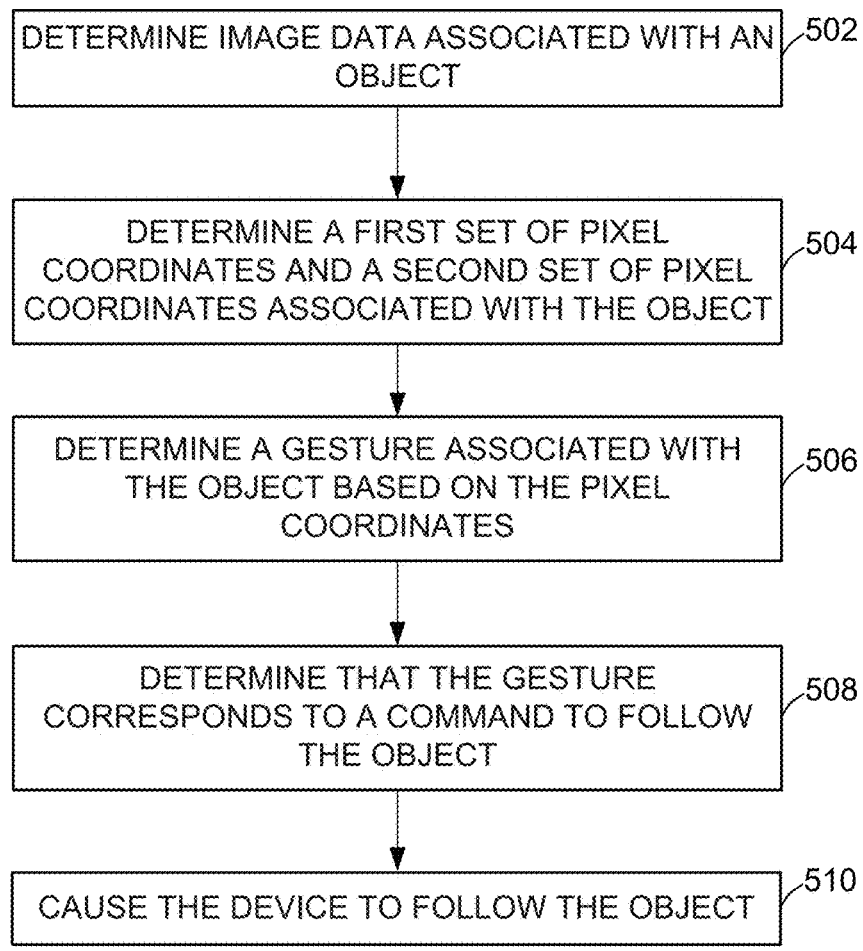
FIG. 5 illustrates a flow diagram for a process of operating a self-driving mobile robot, in accordance with one or more example embodiments of the present disclosure.

FIG. 5 illustrates a flow diagram for a process 500 of operating a self-driving mobile robot, in accordance with one or more example embodiments of the present disclosure.

At block 502, processing circuitry (e.g., processing circuitry 304) of a device (e.g., self-driving mobile robot 102 of FIG. 1) may determine image data associated with an object (e.g., human 104A in FIG. 1). The image data may be captured by a camera (e.g., image capture device 320 of FIG. 3).

At block 504, the processing circuitry of the device may determine respective pixel coordinates (e.g., two-dimensional X-Y coordinates associated with a coordinate plane in the image) associated with the objects. For example, the object may be a person, and the pixel coordinates may be associated with the identified body parts of the person. The device may identify multiple body parts located at different locations in an image. The locations of the body parts may be determined using a coordinate system whose 0,0 starting point may be the lower left corner of the image.

At block 506, the processing circuitry of the device may determine a gesture associated with the object based on the pixel coordinates. For example, if a hand location is identified relative to a location of a shoulder or neck, the device may determine that a hand up gesture may be attempted by the person in the image. If an arm is extended, the device may determine an arm out gesture. Multiple gestures may be determined by analyzing the pixel locations of identified body parts in an image.

At block 508, the processing circuitry of the device may determine that the gesture corresponds to a command to follow the object (e.g., person). If the gesture is indicative of a follow me command, the device may determine the location of the object providing the command by associating the image data corresponding to the object and the gesture with Lidar data to identify a cluster with which to associate the gesture. If the cluster moves, the device may identify the updated location of the cluster to allow the device to follow the cluster.

At block 510, the processing circuitry of the device may cause the device to follow the object. Following the object may include maintaining a distance between the device and the object. To detect distance, the device may refer to reflections of transmitted pulses associate with an assigned cluster. As a cluster moves, the device should move based on the distance detected between the object and the device. The device may detect other objects and navigate around those objects as appropriate to follow the object. To move the device, the processing circuitry may send one or more signals to the device, such as to a motor or processor controlling movable components such as wheels, belts, arms, legs, or the like which may cause the device to move.

In one or more embodiments, the tracked cluster that has been identified as having generated the gesture may be set as the human-following target. To follow the human, the device may be assigned navigation goals that are a fixed offset behind the cluster. Given the 2D coordinates of the tracked cluster $(x_c, y_c)$ and the device's current coordinates $(x_r, y_r)$, the device's goal coordinates $(x_g, y_g)$ may be set as $x_g = x_r + (d-o) \cos \theta$, $y_g = y_r + (d-o) \sin \theta$, where o is the following offset, and d and θ are the distance and angle between the cluster and device given by $d = \sqrt{(x_c - x_r)^2 + (y_c - y_r)^2}$, $\theta = \tan^{-1}\left(\frac{y_c - y_r}{x_c - x_r}\right)$.

Figure 6:
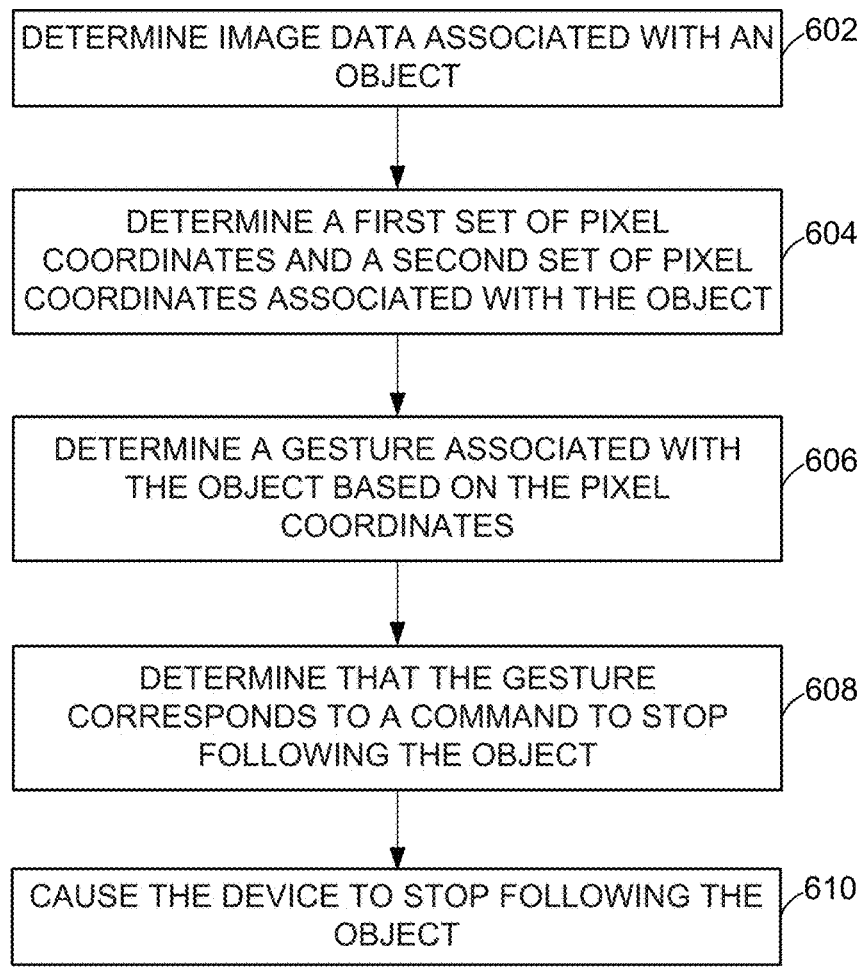
FIG. 6 illustrates a flow diagram for a process of operating a self-driving mobile robot, in accordance with one or more example embodiments of the present disclosure.

FIG. 6 illustrates a flow diagram for a process 600 of operating a self-driving mobile robot, in accordance with one or more example embodiments of the present disclosure. For example, a self-driving mobile robot may be following a human operator in response to a follow me command.

At block 602, processing circuitry (e.g., processing circuitry 304) of a device (e.g., self-driving mobile robot 102 of FIG. 1) may determine image data associated with an object. For example, given an image (e.g., image 201 of FIG. 2A, the device may identify a person (e.g., human 104A of FIG. 1) in the image, and may identify one or more body parts of the person in the image.

At block 604, the processing circuitry of the device may determine respective sets of pixel coordinates associated with parts of the object. If the object is a person, then body parts and features of the person may be identified, and the location coordinates of those body parts may be determined on a coordinate plane associated with the image. For example, the horizontal and vertical (e.g., X-Y) coordinates of respective body parts may be identified and compared with one another.

At block 606, the processing circuitry of the device may determine a gesture associated with the object based on the pixel coordinates. By comparing the pixel coordinates of different body parts identified in an image, for example, the device may determine poses associated with gestures. For example, a hand being higher vertically than a shoulder or neck may correspond to a hand up gesture.

At block 608, the processing circuitry of the device may determine that the gesture corresponds to a command to stop following the object. For example, if the device previously received a follow me command and was following an object, the device may continue to receive commands from the object until a gesture is recognized by the device indicating otherwise. Such a gesture may indicate that the follow me command has concluded.

At block 610, the processing circuitry may cause the device to stop following the object. This may include the device no longer needing to maintain a distance between the device and the object if the object moves. The device may continue to identify gestures and respond to corresponding commands from the object or from other nearby objects.

Figure 7:
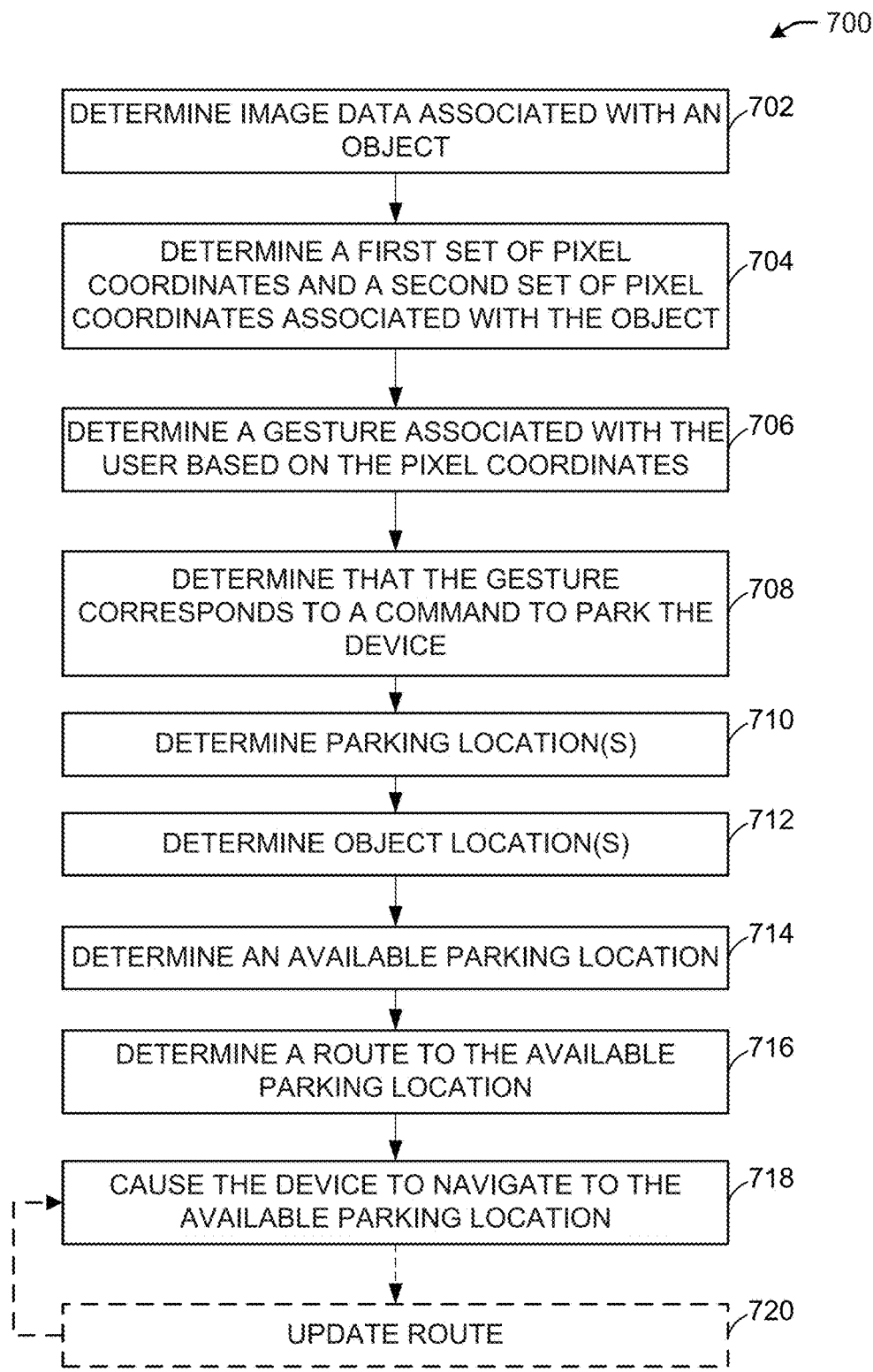
FIG. 7 illustrates a flow diagram for a process of operating a self-driving mobile robot, in accordance with one or more example embodiments of the present disclosure.

FIG. 7 illustrates a flow diagram for a process 700 of operating a self-driving mobile robot, in accordance with one or more example embodiments of the present disclosure. For example, a self-driving mobile robot may be instructed to park in an open parking space.

At block 702, processing circuitry (e.g., processing circuitry 304) of a device (e.g., self-driving mobile robot 102 of FIG. 1) may determine image data associated with an object. For example, given an image (e.g., image 201 of FIG. 2A, the device may identify a person (e.g., human 104A of FIG. 1) in the image, and may identify one or more body parts of the person in the image.

At block 704, the processing circuitry of the device may determine respective sets of pixel coordinates associated with parts of the object. If the object is a person, then body parts and features of the person may be identified, and the location coordinates of those body parts may be determined on a coordinate plane associated with the image. For example, the horizontal and vertical (e.g., X-Y) coordinates of respective body parts may be identified and compared with one another.

At block 706, the processing circuitry of the device may determine a gesture associated with the object based on the pixel coordinates. By comparing the pixel coordinates of different body parts identified in an image, for example, the device may determine poses associated with gestures. For example, a hand being higher vertically than a shoulder or neck may correspond to a hand up gesture.

At block 708, the processing circuitry of the device may determine that the gesture corresponds to a command to stop park the device. Parking the device may include stopping and/or at least partially shutting down the device at the device's current location, or navigating the device to an available location such as a parking space where the device may shut down or receive additional commands.

At block 710, the processing circuitry of the device may determine parking locations. The device may store available parking locations which may be analyzed by the device to determine an available parking space. A set of available parking spaces may be determined by searching a set of predefined parking spaces to determine if they are accessible.

At block 712, the processing circuitry of the device may determine object locations. Using Lidar radar pulses and their reflections, the device may identify clusters which may correspond to objects. Determining the distance of the objects from the device and their respective directions from the device, the device may determine the respective locations of the objects and whether those locations correspond to the locations of parking spaces (e.g., using a coordinate system).

At block 714, the processing circuitry of the device may determine an available parking location. Parking space accessibility may be determined by checking an occupancy grid cost map for obstacles. If any grid cells of the cost map corresponding to the coordinates of a parking space are shown as occupied (e.g., correspond to an identified object cluster), the space may be removed from the eligible set at least temporarily.

At block 716, the processing circuitry of the device may determine a route or path to the available parking location. The device may determine a navigation goal corresponding to the closest unoccupied parking spot, for example, or to a parking spot closest to a location associated with a user input (e.g., a destination location of the device or a human). Given an eligible set of $N_p$ parking spots, each with coordinates $(x_p,y_p)$, the device may identify a parking place p*, given by $$p^* = \underset{p}{\operatorname{argmin}} \sum_{p=1}^{N_p} \sqrt{(x_p - x_r)^2 + (y_p - y_r)^2},$$

where $(x_r,y_r)$ may be the device's current coordinates.

At block 718, the processing circuitry of the device may cause the device to navigate to the available parking location. To move the device, the processing circuitry may send one or more signals to the device, such as to a motor or processor controlling movable components such as wheels, belts, arms, legs, or the like which may cause the device to move.

At block 720, the processing circuitry of the device optionally may update the route to the available parking space. For example, if the device detects other objects impeding the route to the parking space, the device may determine, based on the location of an object, an alternative route around the objects. The device also may adjust the route based on identified or input conditions such as surrounding environmental conditions unsafe for operation of the device, restrictions associated with operation of the device at certain locations or times, or user commands instructing the device to alter the route.

Figure 8A:
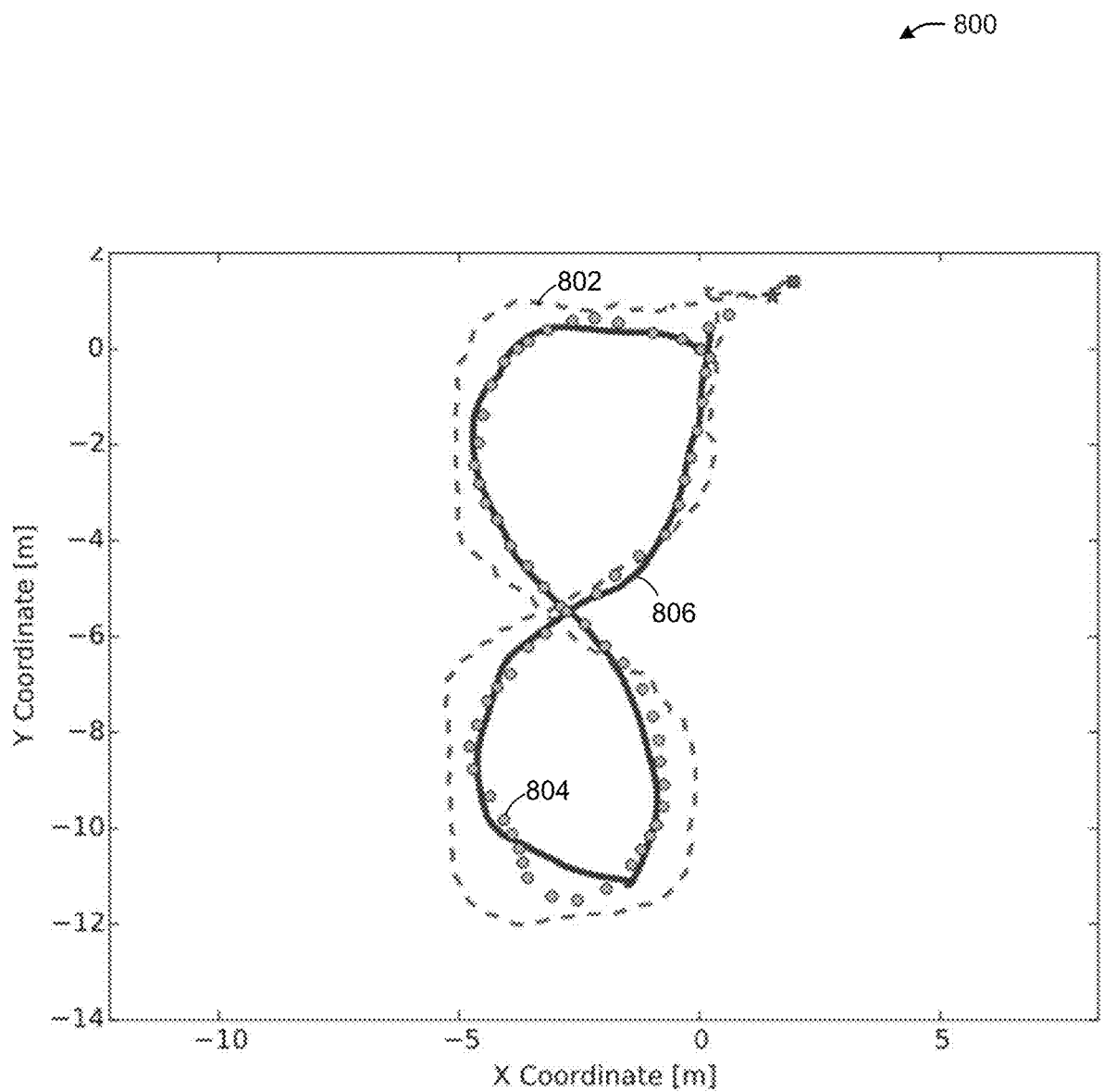
FIG. 8A illustrates a graphical result of a robot follow-me command, in accordance with one or more example embodiments of the present disclosure.

FIG. 8A illustrates a graphical result 800 of a robot follow-me command, in accordance with one or more example embodiments of the present disclosure.

Referring to FIG. 8A, follow-me mode results are shown based on a human (e.g., human 104A of FIG. 1) having commanded a robot (e.g., self-driving mobile robot 102 of FIG. 1) via a gesture. The path of the human is shown by the dotted lines 802. The navigation goals are shown by the dots (e.g., dot 804), representing the individual goal locations determined by the robot while executing the follow me command. The actual path of the robot is shown by the solid line 806. The human's path represents a "figure-8" pattern walked at approximately 0.5 m/s.

As shown in FIG. 8A, the human and robot paths are similar, but not identical. Each goal location is placed 1 m away from the human's path in the direction of the robot, and as the human moves, the robot cuts an internal path towards the human's next current position. This behavior is desirable because it allows the robot to keep up with the human without coming uncomfortably close to them (e.g., maintaining a distance). As a result, the robot is able to follow a human after receiving a follow me command via gesture.

Figure 8B:
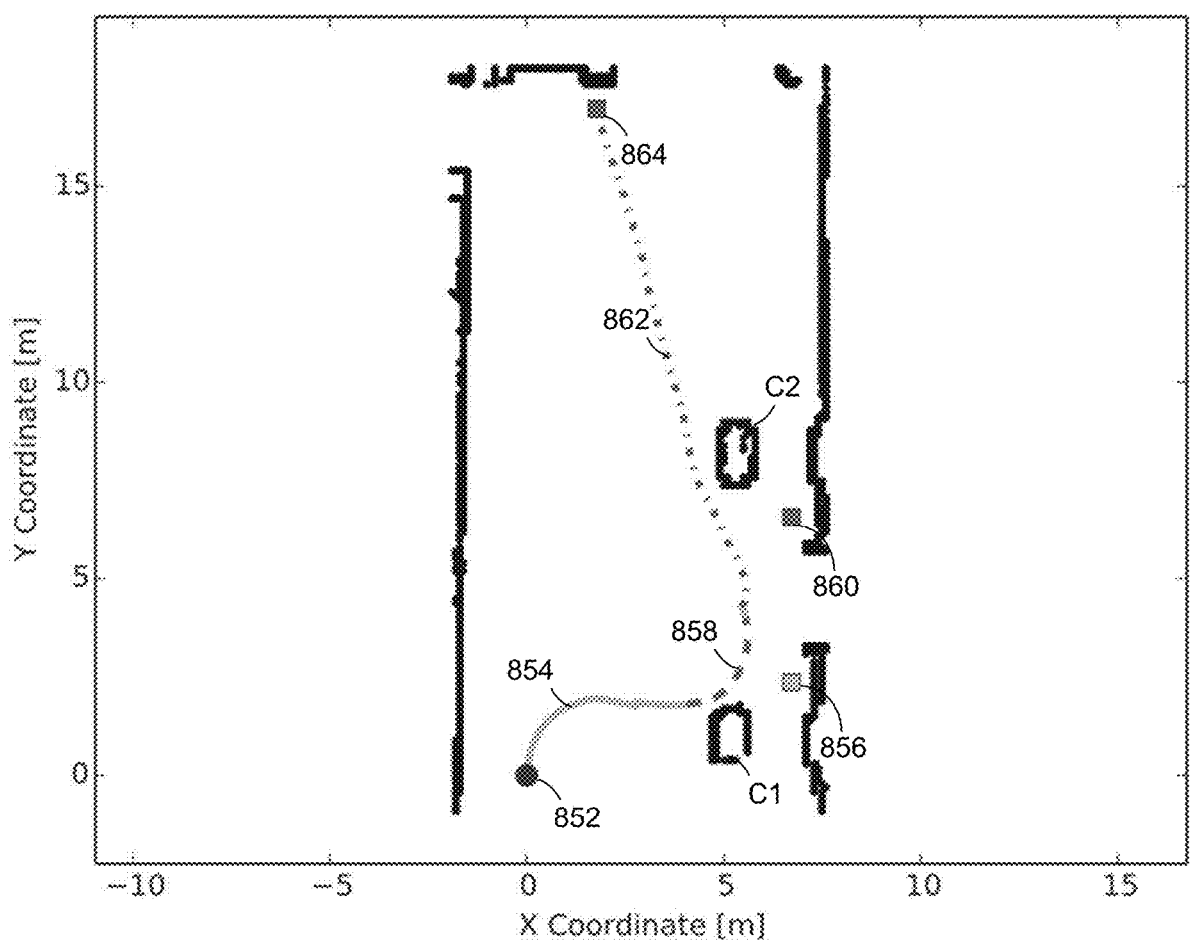
FIG. 8B illustrates a result of a robot parking command, in accordance with one or more example embodiments of the present disclosure.

FIG. 8B illustrates a result 850 of a robot parking command, in accordance with one or more example embodiments of the present disclosure.

Referring to FIG. 8B, results of a parking command are shown based on a human (e.g., human 104A of FIG. 1) having commanded a robot (e.g., self-driving mobile robot 102 of FIG. 1) via a gesture. The robot's initial position after receiving the parking command is shown at point 852. The robot may take path 854 toward goal location 856 until identifying cluster C1. Due to the cluster C1 becoming an obstacle for the device, the device may determine a new path 858 to goal location 860. Along the path 858, the device may identify another obstacle in the form of cluster C2, and may determine a new path 862 to goal location 864. If no more obstacles are detected along path 862, the device may continue to goal location 864, which may be the intended final destination.

After identifying that goal location 860 is occupied, sensor noise may cause the robot to reevaluate the eligible set of parking spaces, and the robot may consider moving to goal location 856 before identifying that both goal location 856 and goal location 860 are still occupied. The robot may identify and proceed to the parking spot (e.g., goal location 864) that is identified as unoccupied. Upon reaching goal location 864, the robot successfully parks and waits for new commands. Thus, detected sensor noise may cause the device to reevaluate potential locations to determine whether they are available parking spaces.

After a human provides a command to a robot, the robot may experience external circumstances preventing it from executing that command. For example, if the robot is told to park at a specific location, it may not be able to if that location is already occupied by an obstacle. In such cases, either the robot may prompt a user (e.g., human 104A) for additional input or automatically may determine a contingency plan (e.g., a backup path) to accomplish the task of parking.

The robot may determine a navigation goal (e.g., goal location) corresponding to the closest unoccupied parking spot. Given an eligible set of $N_p$ parking spots, each with coordinates $(x_p,y_p)$, the robot may determine a parking place p*, given by $$p^* = \underset{p}{\operatorname{argmin}} \sum_{p=1}^{N_p} \sqrt{(x_p - x_r)^2 + (y_p - y_r)^2},$$

where $(x_r,y_r)$ are the robot's current coordinates. The robot then may navigate to the parking spot.

If the robot reaches the goal position (e.g., goal location 864) and orientation (e.g., within a threshold), the parking maneuver may be completed and the robot may wait for new commands from another gesture. However, if the assigned parking spot becomes occupied, the spot may be removed from the eligible set and another available parking space may be identified. If no spots are available, the robot may patrol and monitor each spot until one becomes available. If a previously occupied space becomes unoccupied, that space can immediately be re-added to the eligible set.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Example 1 may be a device comprising storage and processing circuitry configured to: determine, based at least in part on one or more reflections associated with one or more pulses, a cluster; associate the cluster with an object identified in an image; determine, based at least in part on an image analysis of the image, a gesture associated with the object; determine, based at least in part on the gesture, a command associated with an action; and cause the device to perform the action.

Example 2 may include the device of example 1 and/or some other example herein, wherein the object is associated with a person, wherein to determine the gesture comprises the processing circuitry being further configured to: determine a first set of pixel coordinates of the object, wherein the first set of pixel coordinates is associated with a first portion of the person's body; determine a second set of pixel coordinates of the image, wherein the second set of pixel coordinates is associated with a second portion of the person's body; determine, based at least in part on the first set of pixel coordinates and the second set of pixel coordinates, that the person's body is in a pose associated with the gesture.

Example 3 may include the device of examples 1 or 2 and/or some other example herein, wherein the first portion of the person's body is associated with a hand or wrist and the second portion of the person's body is associated with a neck or shoulder, wherein the hand or wrist is above the neck or shoulder, and wherein the gesture includes a hand up or arm up gesture.

Example 4 may include the device of example 2 and/or some other example herein, wherein the first portion of the person's body is associated with a hand or wrist and the second portion of the person's body is associated with a shoulder, wherein a distance between the hand or wrist and the shoulder is greater than a distance threshold, and wherein the gesture includes an arm out gesture.

Example 5 may include the device of example 1 and/or some other example herein, wherein the command is associated with an indication that the device is to follow the object, and wherein to cause to perform the action comprises to cause the device to follow the object.

Example 6 may include the device of example 5 and/or some other example herein, wherein to cause the device to follow the object comprises the processing circuitry being further configured to maintain a distance between the device and the object.

Example 7 may include the device of example 1 and/or some other example herein, wherein the processing circuitry is further configured to: cause to send one or more additional pulses; identify one or more additional reflections associated with the one or more additional pulses; identify a second image; determine, based at least in part on one or more pixel coordinates of the second image, a second gesture; associate the second gesture with the object; and determine, based at least in part on the second gesture, a second command indicating that the device is to stop following the object.

Example 8 may include the device of example 1 and/or some other example herein, wherein the command is associated with an indication that the device is to navigate to an unoccupied location, wherein to cause the device to perform the action comprises the processing circuitry being further configured to: determine a first location of the device; determine a second location; cause to send one or more additional pulses; identify one or more additional reflections associated with the one or more additional pulses; determine a third location of a second object based at least in part on the one or more additional reflections; determine, based at least in part on the one or more additional reflections, that the third location of the second object is not the second location; determine, based at least in part on the third location of the second object, a route from the first location to the second location; and cause the device to move based at least in part on the route.

Example 9 may include the device of example 8 and/or some other example herein, wherein the route is a first route, and wherein the processing circuitry is further configured to: determine a fourth location of a third object based at least in part on the one or more additional reflections; determine, based at least in part on the fourth location of the third object, a second route, wherein the second route is different than the first route; and cause the device to move based at least in part on the second route.

Example 10 may include the device of example 1 and/or some other example herein, wherein to associate the cluster with the object comprises the processing circuitry being further configured to: determine a location of the object in the image; determine a location of the cluster; and determine a yaw angle based at least in part on the location of the object and the location of the cluster.

Example 11 may include a non-transitory computer-readable medium storing computer-executable instructions which when executed by one or more processors result in performing operations comprising: determining, by a device, based at least in part on one or more reflections associated with one or more pulses, a cluster; associating the cluster with an object identified in an image; determining, based at least in part on an image analysis of the image, a gesture associated with the object; determining, based at least in part on the gesture, a command associated with an action; and causing the device to perform the action.

Example 12 may include the non-transitory computer-readable medium of example 11 and/or some other example herein, wherein the object is associated with a person, wherein determining the gesture comprises: determining a first set of pixel coordinates of the object, wherein the first set of pixel coordinates is associated with a first portion of the person's body; determining a second set of pixel coordinates of the image, wherein the second set of pixel coordinates is associated with a second portion of the person's body; determining, based at least in part on the first set of pixel coordinates and the second set of pixel coordinates, that the person's body is in a pose associated with the gesture.

Example 13 may include the non-transitory computer-readable medium of example 12 and/or some other example herein, wherein the first portion of the person's body is associated with a hand or wrist and the second portion of the person's body is associated with a neck or shoulder, wherein the hand or wrist is above the neck or shoulder, and wherein the gesture includes a hand up or arm up gesture.

Example 14 may include the non-transitory computer-readable medium of example 12 and/or some other example herein, wherein the first portion of the person's body is associated with a hand or wrist and the second portion of the person's body is associated with a shoulder, wherein a distance between the hand or wrist and the shoulder is greater than a distance threshold, and wherein the gesture includes an arm out gesture.

Example 15 may include the non-transitory computer-readable medium of example 11 and/or some other example herein, wherein the command is associated with an indication that the device is to follow the object, and wherein causing to perform the action comprises causing the device to follow the object.

Example 16 may include the non-transitory computer-readable medium of example 15 and/or some other example herein, wherein causing the device to follow the object comprises maintaining a distance between the device and the object.

Example 17 may include the non-transitory computer-readable medium of example 15 and/or some other example herein, the operations further comprising: causing to send one or more additional pulses; identifying one or more additional reflections associated with the one or more additional pulses; identifying a second image; determining, based at least in part on one or more pixel coordinates of the second image, a second gesture; associating the second gesture with the object; and determining, based at least in part on the second gesture, a second command indicating that the device is to stop following the object.

Example 18 may include the non-transitory computer-readable medium of example 11 and/or some other example herein, wherein the command is associated with an indication that the device is to navigate to an unoccupied location, wherein causing the device to perform the action comprises: determining a first location of the device; determining a second location; causing to send one or more additional pulses; identifying one or more additional reflections associated with the one or more additional pulses; determining a third location of a second object based at least in part on the one or more additional reflections; determining, based at least in part on the one or more additional reflections, that the third location of the second object is not the second location; determining, based at least in part on the third location of the second object, a route from the first location to the second location; and causing the device to move based at least in part on the route.

Example 19 may include the non-transitory computer-readable medium of example 18 and/or some other example herein, wherein the route is a first route, the operations further comprising: determining a fourth location of a third object based at least in part on the one or more additional reflections; determining, based at least in part on the fourth location of the third object, a second route, wherein the second route is different than the first route; and causing the device to move based at least in part on the second route.

Example 20 may include the non-transitory computer-readable medium of example 11 and/or some other example herein, wherein associating the cluster with the object comprises: determining a location of the object in the image; determining a location of the cluster; and determining a yaw angle based at least in part on the location of the object and the location of the cluster.

Example 21 may include a method comprising: determining, by processing circuitry of a device, based at least in part on the one or more reflections, a cluster; associating, by the processing circuitry, the cluster with an object identified in an image; determining, by the processing circuitry, based at least in part on an image analysis of the image, a gesture associated with the object; determining, by the processing circuitry, based at least in part on the gesture, a command associated with an action; and causing, by the processing circuitry, the device to perform the action.

Example 22 may include the method of example 21 and/or some other example herein, wherein the object is associated with a person, wherein determining the gesture comprises: determining a first set of pixel coordinates of the object, wherein the first set of pixel coordinates is associated with a first portion of the person's body; determining a second set of pixel coordinates of the image, wherein the second set of pixel coordinates is associated with a second portion of the person's body; determining, based at least in part on the first set of pixel coordinates and the second set of pixel coordinates, that the person's body is in a pose associated with the gesture.

Example 23 may include the method of example 22 and/or some other example herein, wherein the first portion of the person's body is associated with a hand or wrist and the second portion of the person's body is associated with a neck or shoulder, wherein the hand or wrist is above the neck or shoulder, and wherein the gesture includes a hand up or arm up gesture.

Example 24 may include the method of example 22 and/or some other example herein, wherein the first portion of the person's body is associated with a hand or wrist and the second portion of the person's body is associated with a shoulder, wherein a distance between the hand or wrist and the shoulder is greater than a distance threshold, and wherein the gesture includes an arm out gesture.

Example 25 may include the method of example 21 and/or some other example herein, wherein the command is associated with an indication that the device is to follow the object, and wherein causing to perform the action comprises causing the device to follow the object.

Example 26 may include an apparatus comprising means for: determining, based at least in part on the one or more reflections, a cluster; associating the cluster with an object identified in an image; determining, based at least in part on an image analysis of the image, a gesture associated with the object; determining, based at least in part on the gesture, a command associated with an action; and causing the device to perform the action.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising storage and processing circuitry configured to:
   determine, based at least in part on one or more reflections associated with one or more light detection and ranging (LIDAR) pulses captured by the device, a LIDAR cluster, the LIDAR cluster comprising LIDAR data associated with the one or more reflections;
   identify an object represented by a 2D image captured by the device, the 2D image comprising image data different than the LIDAR data;
   determine that the LIDAR cluster is associated with the object represented by the 2D image;
   determine a gesture associated with the object represented by the 2D image;
   determine, based at least in part on the gesture, a command associated with an action;
   convert the image data associated with the 2D image into a 3D coordinate frame of the device using the LIDAR data; and
   cause the device to perform the action using the 3D coordinate frame of the device.

2. The device of claim 1, wherein the object is associated with a person, wherein to determine the gesture comprises the processing circuitry being further configured to:
   determine, based on the image data, a first set of pixel coordinates of the object, wherein the first set of pixel coordinates is associated with a first portion of the person's body;
   determine, based on the image data, a second set of pixel coordinates of the image, wherein the second set of pixel coordinates is associated with a second portion of the person's body; and
   determine, based at least in part on the first set of pixel coordinates and the second set of pixel coordinates, that the person's body is in a pose associated with the gesture.

3. The device of claim 2, wherein the first portion of the person's body is associated with a hand or wrist and the second portion of the person's body is associated with a neck or shoulder, wherein the hand or wrist is above the neck or shoulder, and wherein the gesture includes a hand up or arm up gesture.

4. The device of claim 2, wherein the first portion of the person's body is associated with a hand or wrist and the second portion of the person's body is associated with a shoulder, wherein a distance between the hand or wrist and the shoulder is greater than a distance threshold, and wherein the gesture includes an arm out gesture.

5. The device of claim 1, wherein the command is associated with an indication that the device is to follow the object, and wherein to cause to perform the action comprises to cause the device to follow the object.

6. The device of claim 5, wherein to cause the device to follow the object comprises the processing circuitry being further configured to maintain a distance between the device and the object, and wherein to maintain the distance is based at least in part on the LIDAR data.

7. The device of claim 5, wherein the processing circuitry is further configured to:
   cause to send one or more additional LIDAR pulses;
   identify one or more additional reflections associated with the one or more additional LIDAR pulses;
   identify a second image;
   determine, based at least in part on one or more pixel coordinates of the second image, a second gesture;
   determine that the second gesture is associated with the object and with the LIDAR cluster; and
   determine, based at least in part on the second gesture, a second command indicating that the device is to stop following the object.

8. The device of claim 1, wherein the command is associated with an indication that the device is to navigate to an unoccupied location, wherein to cause the device to perform the action comprises the processing circuitry being further configured to:
  determine a first location of the device;
  determine a second location;
  cause to send one or more additional LIDAR pulses;
  identify one or more additional reflections associated with the one or more additional LIDAR pulses;
  determine a third location of a second object based at least in part on the one or more additional reflections;
  determine, based at least in part on the one or more additional reflections, that the third location of the second object is not the second location;
  determine, based at least in part on the third location of the second object, a route from the first location to the second location; and
  cause the device to move based at least in part on the route.

9. The device of claim 8, wherein the route is a first route, and wherein the processing circuitry is further configured to:
  determine a fourth location of a third object based at least in part on the one or more additional reflections;
  determine, based at least in part on the fourth location of the third object, a second route, wherein the second route is different than the first route; and
  cause the device to move based at least in part on the second route.

10. The device of claim 1, wherein to associate the LIDAR cluster with the object represented by the image comprises the processing circuitry being further configured to:
  determine a location of the object represented by the image;
  determine a location of the LIDAR cluster; and
  determine a yaw angle based at least in part on the location of the object and the location of the LIDAR cluster.

11. A non-transitory computer-readable medium storing computer-executable instructions which when executed by one or more processors result in performing operations comprising:
  determining, based at least in part on one or more reflections associated with one or more light detection and ranging (LIDAR) pulses captured by a device, a LIDAR cluster, the LIDAR cluster comprising LIDAR data associated with the one or more reflections;
  identifying an object represented by a 2D image captured by the device, the 2D image comprising image data different than the LIDAR data;
  determining that the LIDAR cluster is associated with the object represented by the 2D image;
  determining a gesture associated with the object represented by the 2D image;
  determining, based at least in part on the gesture, a command associated with an action;
  converting the image data associated with the 2D image into a 3D coordinate frame of the device using the LIDAR data; and
  causing the device to perform the action using the 3D coordinate frame of the device.

12. The non-transitory computer-readable medium of claim 11, wherein the object is associated with a person, wherein determining the gesture comprises:
  determining, based on the image data, a first set of pixel coordinates of the object, wherein the first set of pixel coordinates is associated with a first portion of the person's body;
  determining, based on the image data, a second set of pixel coordinates of the image, wherein the second set of pixel coordinates is associated with a second portion of the person's body; and
  determining, based at least in part on the first set of pixel coordinates and the second set of pixel coordinates, that the person's body is in a pose associated with the gesture.

13. The non-transitory computer-readable medium of claim 12, wherein the first portion of the person's body is associated with a hand or wrist and the second portion of the person's body is associated with a neck or shoulder, wherein the hand or wrist is above the neck or shoulder, and wherein the gesture includes a hand up or arm up gesture.

14. The non-transitory computer-readable medium of claim 12, wherein the first portion of the person's body is associated with a hand or wrist and the second portion of the person's body is associated with a shoulder, wherein a distance between the hand or wrist and the shoulder is greater than a distance threshold, and wherein the gesture includes an arm out gesture.

15. The non-transitory computer-readable medium of claim 11, wherein the command is associated with an indication that the device is to follow the object, and wherein causing to perform the action comprises causing the device to follow the object.

16. The non-transitory computer-readable medium of claim 15, wherein causing the device to follow the object comprises maintaining a distance between the device and the object, and wherein maintaining the distance is based at least in part on the LIDAR data.

17. The non-transitory computer-readable medium of claim 15, the operations further comprising:
  causing to send one or more additional LIDAR pulses;
  identifying one or more additional reflections associated with the one or more additional LIDAR pulses;
  identifying a second image;
  determining, based at least in part on one or more pixel coordinates of the second image, a second gesture;
  determining that the second gesture is associated with the object; and
  determining, based at least in part on the second gesture, a second command indicating that the device is to stop following the object.

18. The non-transitory computer-readable medium of claim 11, wherein the command is associated with an indication that the device is to navigate to an unoccupied location, wherein causing the device to perform the action comprises:
  determining a first location of the device;
  determining a second location;
  causing to send one or more additional LIDAR pulses;
  identifying one or more additional reflections associated with the one or more additional LIDAR pulses;
  determining a third location of a second object based at least in part on the one or more additional reflections;
  determining, based at least in part on the one or more additional reflections, that the third location of the second object is not the second location;
  determining, based at least in part on the third location of the second object, a route from the first location to the second location; and
  causing the device to move based at least in part on the route.

19. The non-transitory computer-readable medium of claim 18, wherein the route is a first route, the operations further comprising:

determining a fourth location of a third object based at least in part on the one or more additional reflections;

determining, based at least in part on the fourth location of the third object, a second route, wherein the second route is different than the first route; and causing the device to move based at least in part on the second route.

20. A method, comprising:

determining, by processing circuitry of a device, based at least in part on one or more reflections associated with one or more light detection and ranging (LIDAR) pulses captured by the device, a LIDAR cluster, the LIDAR cluster comprising LIDAR data associated with the one or more reflections;

identifying, by the processing circuitry, an object represented by a 2D image captured by the device, the 2D image comprising image data different than the LIDAR data;

determining, by the processing circuitry, that the LIDAR cluster is associated with the object represented by the 2D image;

determining, by the processing circuitry, a gesture associated with the object represented by the 2D image;

determining, by the processing circuitry, based at least in part on the gesture, a command associated with an action;

converting, by the processing circuitry, the image data associated with the 2D image into a 3D coordinate frame of the device using the LIDAR data; and causing, by the processing circuitry, the device to perform the action using the 3D coordinate frame of the device.

* * * * *